United States Patent
Kosaka

(10) Patent No.: US 8,646,993 B2
(45) Date of Patent: Feb. 11, 2014

(54) IMAGE PICKUP APPARATUS

(71) Applicant: Canon Kabushiki Kaisha, Tokyo (JP)

(72) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/754,617

(22) Filed: Jan. 30, 2013

(65) Prior Publication Data

US 2013/0202282 A1   Aug. 8, 2013

(30) Foreign Application Priority Data

Feb. 3, 2012 (JP) ................................ 2012-022148

(51) Int. Cl.
*G03B 9/00* (2006.01)
*G03B 19/12* (2006.01)

(52) U.S. Cl.
USPC .......................................... 396/357; 396/443

(58) Field of Classification Search
USPC ........................... 396/354, 357, 358, 443, 463
See application file for complete search history.

(56) References Cited

U.S. PATENT DOCUMENTS

| | | | | |
|---|---|---|---|---|
| 5,479,235 A | * | 12/1995 | Haraguchi | 396/358 |
| 2011/0050952 A1 | * | 3/2011 | Kosaka | 348/231.1 |
| 2011/0052184 A1 | * | 3/2011 | Nakagawa | 396/502 |
| 2013/0202282 A1 | * | 8/2013 | Kosaka | 396/357 |

FOREIGN PATENT DOCUMENTS

JP     10-142686 A     5/1998

* cited by examiner

*Primary Examiner* — William B Perkey
(74) *Attorney, Agent, or Firm* — Canon USA Inc IP Division

(57) ABSTRACT

After a shutter drive motor drives a shutter to a holding mode, if a first determination unit determines that a mirror is not ready to move to a mirror up mode, a control unit switches the shutter drive motor to a first braking mode. After the shutter drive motor is switched to the first braking mode, if the first determination unit determines that a mirror is ready to move to the mirror up mode before a second determination unit determines that the shutter drive motor is to be switched to a second braking mode, the control unit switches the shutter drive motor to an open mode until a predetermined period of time has elapsed since the first determination unit determined that the mirror was ready to move to a mirror up mode.

7 Claims, 9 Drawing Sheets

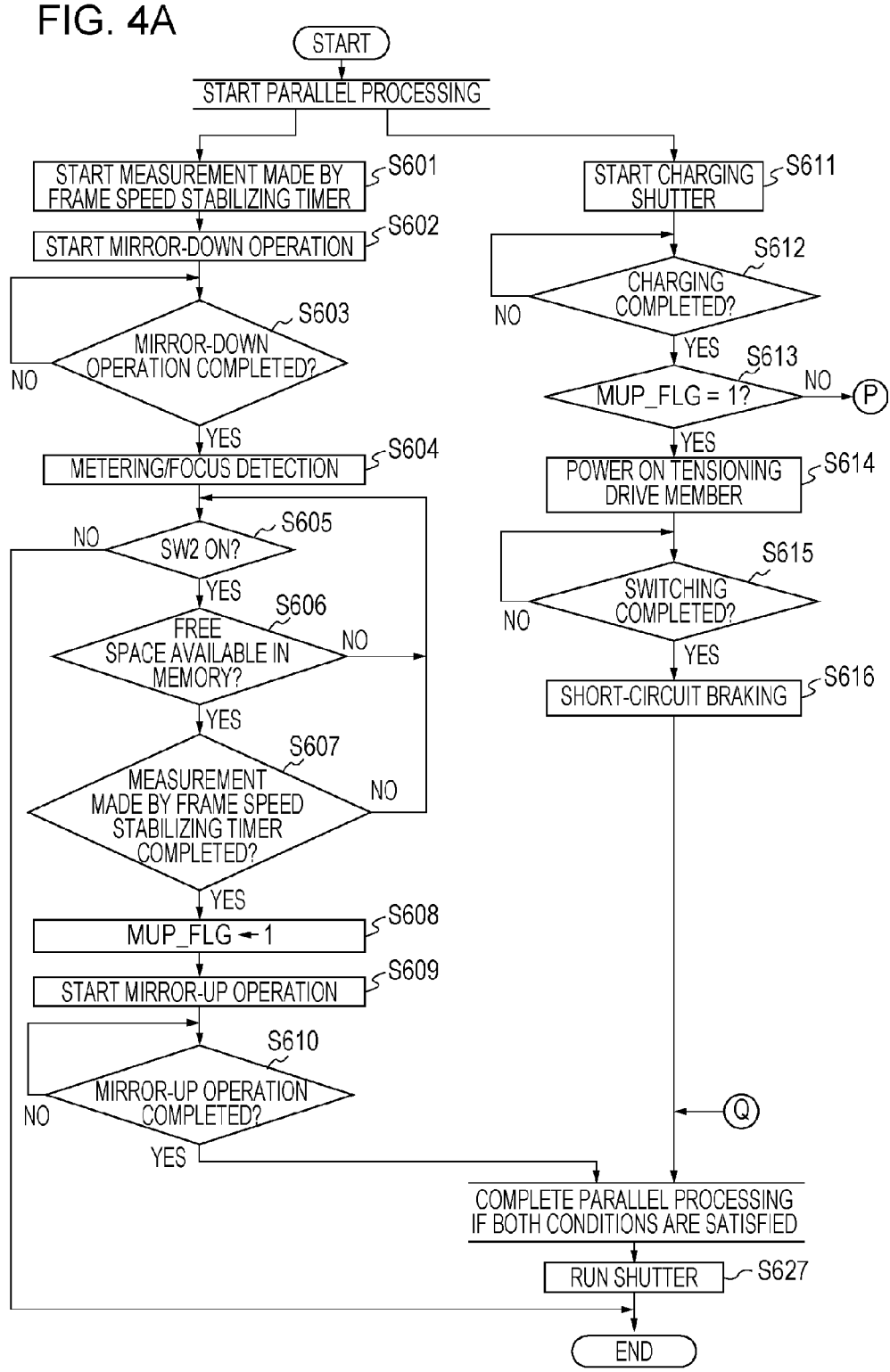

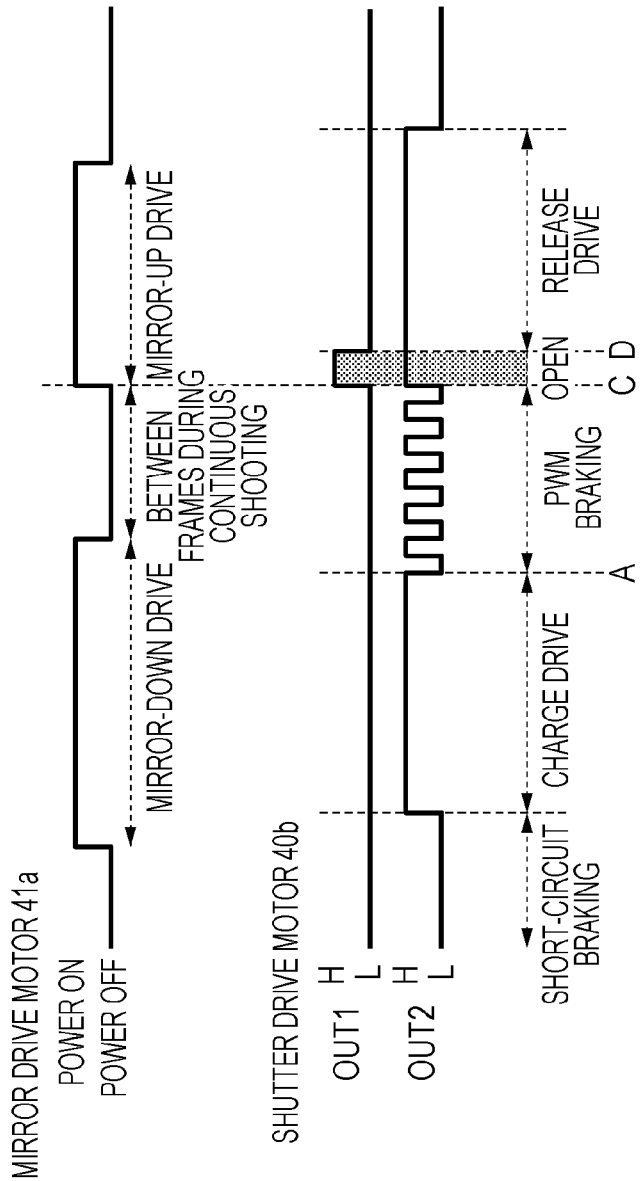

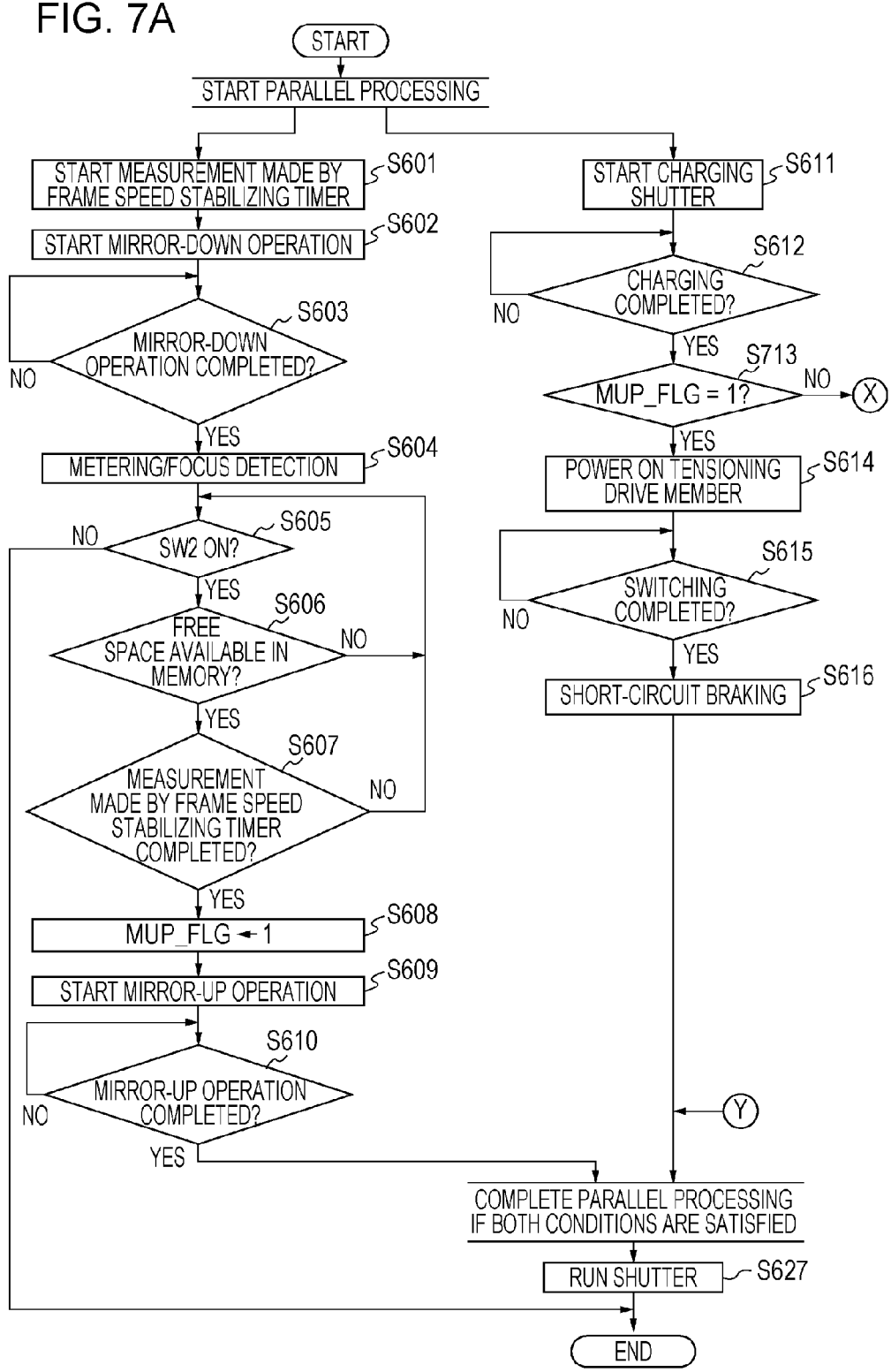

IMAGE PICKUP APPARATUS

BACKGROUND OF THE INVENTION

1. Field of the Invention

The present disclosure relates to an image pickup apparatus and, in particular, to an image pickup apparatus including a motor for driving a mirror and a motor for driving a shutter.

2. Description of the Related Art

In general, image pickup apparatuses such as single-lens reflex cameras include a mirror unit that flips up and down a mirror known as a quick-return mirror using a motor. In such single-lens reflex cameras including a motor-driven mirror unit, the motor is powered on to flip up the mirror when a shutter release operation is started. The mirror is maintained at a mirror-up position, and a shutter (a focal plane shutter) is released to start exposure. Subsequently, the shutter is closed to end the exposure. Thereafter, the motor is powered on to flip down the mirror, and so-called mechanical charge is performed (refer to, for example, Japanese Patent Laid-Open No. 10-142686).

However, existing image pickup apparatuses do not take into account an increase in an inrush current caused by power-on of a mirror motor for mirror flip up and power-on of a shutter motor for shutter charge releasing operation.

SUMMARY OF THE INVENTION

An image pickup apparatus includes a shutter being switchable between a holding mode, in which a shutter spring is charged to hold a shutter drive member, a release mode, in which the shutter drive member that is held is released with the shutter spring being charged, and a travel end mode, in which the shutter drive member has traveled from the release mode using the shutter spring, a shutter drive motor configured to switch the shutter from the travel end mode to the holding mode and from the holding mode to the release mode, a mirror configured to switch between a mirror down mode, in which the mirror enters an imaging optical path and a mirror up mode, in which the mirror flips out of the imaging optical path, a mirror drive motor configured to drive the mirror from the mirror down mode to the mirror up mode, a control unit configured to control the shutter drive motor so the shutter drive motor is switched between a drive mode, in which the shutter drive motor is driven, a first braking mode, in which the shutter drive motor is decelerated, a second braking mode, in which the shutter drive motor is decelerated more strongly than in the first braking mode, and an open mode in which the shutter drive motor is idle, a first determination unit configured to determine whether the mirror drive motor is ready to drive the mirror from the mirror down mode to the mirror up mode, and a second determination unit configured to determine whether the shutter drive motor is to be switched from the first braking mode to the second braking mode. The mirror holder may have a cam portion formed therein, and the rotation member may have a follower portion formed therein. The follower portion is capable of tracing a profile of the cam portion. If the first determination unit determines that the mirror drive motor is not ready to start driving the mirror to the mirror up mode after the shutter drive motor drives the shutter to the holding mode, the control unit switches the shutter drive motor to the first braking mode. If the first determination unit determines that the mirror drive motor is ready to start driving the mirror to the mirror up mode after the shutter drive motor is switched to the first braking mode and before the second determination unit determines that the shutter drive motor is to be switched to the second braking mode, the control unit switches the shutter drive motor to the open mode until a predetermined period of time has elapsed since the first determination unit determined that the mirror drive motor was ready to start driving the mirror to the mirror up mode. According to an aspect of the present invention, the present invention can, among other things, provide an image pickup apparatus capable of preventing an increase in an inrush current and increasing a continuous shooting speed.

Further features of the present disclosure will become apparent from the following description of exemplary embodiments with reference to the attached drawings.

BRIEF DESCRIPTION OF THE DRAWINGS

FIGS. 4A and 4B are a flowchart of an exemplary operation performed by the image pickup apparatus after the image pickup apparatus receives an image capturing request and completes an exposure process according to the first exemplary embodiment.

FIG. 5 is a sequence diagram illustrating the mode of a mirror drive motor and the mode of a shutter drive motor according to the first exemplary embodiment.

FIGS. 7A and 7B are a flowchart of an exemplary operation performed by an image pickup apparatus after the image pickup apparatus receives an image capturing request and completes an exposure operation according to a second exemplary embodiment.

DESCRIPTION OF THE EMBODIMENTS

First Exemplary Embodiment

Figure 1:
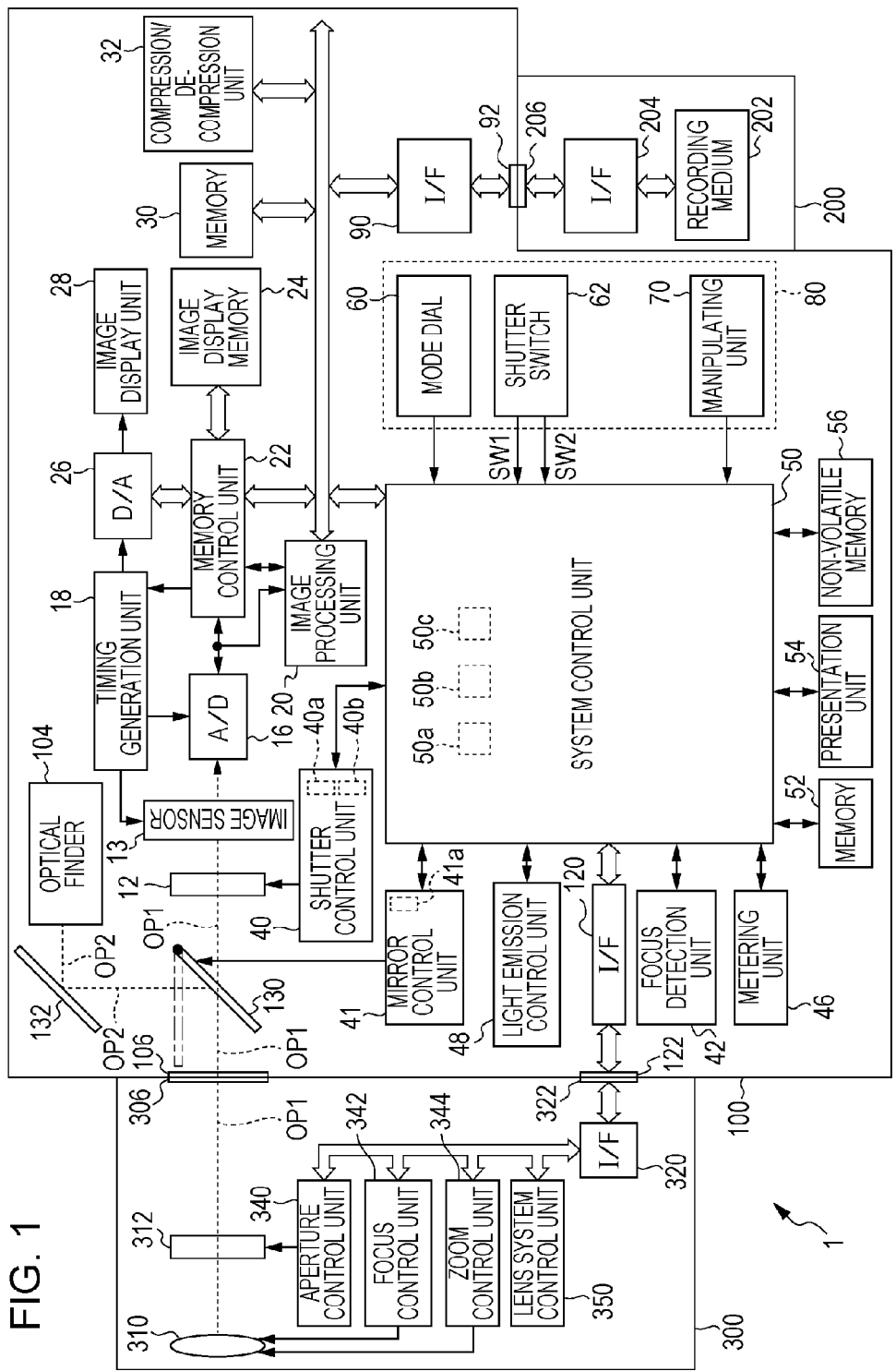
FIG. 1 is a block diagram illustrating the configuration of an image pickup apparatus according to an exemplary embodiment.

FIG. 1 is a block diagram illustrating the configuration of an image pickup apparatus according to an exemplary embodiment of the present disclosure. An image pickup apparatus 1 includes a lens unit 300 and a camera body 100.

The lens unit 300 is of an exchangeable type. The lens unit 300 includes the following components.

A lens mount 306 mechanically connects the lens unit 300 to a camera body 100. The lens mount 306 has a variety of functions for electrically connecting the lens unit 300 to the camera body 100.

A lens 310 refracts an incident light ray and leads the light ray to the camera body 100. The lens 310 includes a focus lens and a zoom lens driven along an imaging optical path OP1 indicated by a dashed line. An aperture 312 controls the amount of light that has passed through the lens 310 and is led to the camera body 100.

An interface 320 connects the lens unit 300 to the camera body 100 in the lens mount 306. A connector 322 is used to electrically connect the lens unit 300 to the camera body 100. The connector 322 exchanges, for example, a control signal, a status signal, and a data signal between the camera body 100 and the lens unit 300. In addition, the connector 322 receives electrical currents having various voltages. In addition, the connector 322 has a function of supplying electrical currents.

An aperture control unit 340 controls the aperture 312 on the basis of photometric information provided from a metering unit 46 (described in more detail below) of the camera body 100 in cooperation with a shutter control unit 40 that controls a shutter 12.

A focus control unit 342 controls the focus lens so as to control focusing of the lens 310. A zoom control unit 344 controls the zoom lens so as to control zooming of the lens 310.

A lens system control unit 350 performs overall control of such components of the lens unit 300.

The lens unit 300 is mounted on the camera body 100. In addition, a recording unit 200 is removably connected to the camera body 100. The camera body 100 includes the following components.

The shutter 12 controls exposure of an image sensor 13. When the shutter 12 is open, a light ray is incident on the lens 310. Through a single lens reflex scheme, the light ray is led to the image sensor 13 via the aperture 312, the lens mount 306, a lens mount 106, and the shutter 12. Thus, the light ray forms an image of a subject on an imaging plane (a pixel array) of the image sensor 13. At that time, as indicated by an alternate long and short dash line, a mirror 130 is in a mirror-up mode in which the mirror 130 flips out of the imaging optical path OP1.

The image sensor 13 photoelectrically converts the subject image formed on the imaging plane (the pixel array) to generate an image signal. The image sensor 13 reads the image signal from the pixel array and outputs the image signal.

An A/D converter 16 converts the image signal (an analog signal) output from the image sensor 13 to image data (a digital signal). Thereafter, the A/D converter 16 outputs the converted image data (the digital signal).

A timing generation unit 18 is controlled by a memory control unit 22 and a system control unit 50. The timing generation unit 18 supplies, for example, a clock signal and a control signal to the image sensor 13, the A/D converter 16, and a D/A converter 26 in accordance with the control performed by the memory control unit 22 and the system control unit 50.

An image processing unit 20 performs a predetermined pixel interpolation process or a predetermined color conversion process on the image data output from the A/D converter 16 or image data output from a memory control unit 22. Thereafter, the image processing unit 20 outputs the processed image data.

The memory control unit 22 controls the A/D converter 16, the timing generation unit 18, the image processing unit 20, an image display memory 24, the D/A converter 26, a memory 30, and a compression/decompression unit 32. The image data output from the A/D converter 16 is written to the image display memory 24 or the memory 30 via the image processing unit 20 and the memory control unit 22. Alternatively, the image data output from the A/D converter 16 is directly written to the image display memory 24 or the memory 30 via the memory control unit 22.

The image display memory 24 temporarily stores image data to be displayed on an image display unit 28. The D/A converter 26 accesses the image display memory 24 via the memory control unit 22 and acquires image data to be displayed. The D/A converter 26 converts the image data to be displayed into a display image signal (an analog signal) and supplies the display image signal to the image display unit 28. The image display unit 28 displays an image in accordance with the display image signal. The image display unit 28 includes, for example, a thin-film transistor-liquid crystal display (TFT-LCD).

The memory 30 temporarily stores (memorizes) image data of a captured still image. In addition, the memory 30 is used as a work area of the system control unit 50.

The compression/decompression unit 32 compresses or decompresses image data through, for example, an adaptive discrete cosine transform (ADCT) process. The compression/decompression unit 32 reads image data stored (memorized) in the memory 30 and performs a compression process or a decompression process on the image data. Thereafter, the compression/decompression unit 32 writes the processed image data to the memory 30 (causes the memory 30 to store the image data).

The shutter control unit 40 controls the shutter 12 on the basis of the photometric information from the metering unit 46 in cooperation with the aperture control unit 340 that controls the aperture 312. The shutter control unit 40 controls a shutter drive motor 40b. A position detection unit 40a detects the rotational position of a cam gear 401 of the shutter 12 (described in more detail below). The shutter drive motor 40b operates so as to charge the shutter 12 and switch the shutter 12 between a holding mode in which the shutter 12 is held and a release mode in which the shutter that is held is released.

The shutter drive motor 40b is in one of the following three modes: a normal drive mode, a short-circuit braking mode, and an open mode. The mode can be switched by signals input to an OUT1 terminal and an OUT2 terminal. If a Low signal is input to the OUT1 terminal and a Hi signal is input to the OUT2 terminal, the shutter drive motor 40b enters the normal drive mode. If a Low signal is input to the OUT1 terminal and a Low signal is input to the OUT2 terminal, the shutter drive motor 40b enters the short-circuit braking mode. In the short-circuit braking mode, terminals connected to a coil of the shutter drive motor 40b are short-circuited. If a Hi signal is input to the OUT1 terminal and a Hi signal is input to the OUT2 terminal, the shutter drive motor 40b enters the open mode. In the open mode, power is not applied to the terminals connected to the coil of the shutter drive motor 40b. In addition, the terminals connected to the coil are not short-circuited. Accordingly, if the shutter drive motor 40b is switched from the normal drive mode to the open mode, a rotation shaft of the shutter drive motor 40b rotates due to a force of inertia. That is, if the shutter drive motor 40b is switched from the normal drive mode to the open mode, the shutter drive motor 40b runs idle.

If a Low signal is input to the OUT1 terminal and a pulse signal generated through a PWM method is input to the OUT2 terminal, the shutter drive motor 40b enters a PWM braking mode in which the shutter drive motor 40b is decelerated more strongly than in the normal drive mode. In the short-circuit braking mode, the shutter drive motor 40b is decelerated more strongly than in the PWM braking mode. The open mode corresponds to a "first braking mode", and the short-circuit braking mode corresponds to a "second braking mode".

A mirror control unit 41 drives the mirror 130 using a mirror drive mechanism so that the mirror 130 stays at one of a mirror up position (indicated by an alternate long and short dash line) and a mirror down position (shown as a solid line). The mirror control unit 41 includes a mirror drive motor 41a. By applying power to the mirror drive motor 41a, the mirror 130 is switched between the mirror-up mode in which the mirror 130 flips out of the imaging optical path OP1 that reaches the image sensor 13 and a mirror down mode in which the mirror 130 is in the imaging optical path OP1.

A focus detection unit 42 performs a process for detecting a focus condition. The focus detection unit 42 receives a light ray incident on the lens 310 via the aperture 312, the lens mounts 306 and 106, the mirror 130, and a focus detection sub-mirror (not illustrated) through a single-lens reflex scheme. Thereafter, the focus detection unit 42 detects the focus condition of an image formed as an optical image. The focus detection unit 42 supplies the result of detection to the system control unit 50.

The metering unit 46 performs a photometric process. The metering unit 46 receives a light ray incident on the lens 310 via the aperture 312, the lens mounts 306 and 106, the mirrors 130 and 132, and a metering lens (not illustrated) through a single-lens reflex scheme. Thereafter, the metering unit 46 detects an exposure condition of an image formed as an optical image. The metering unit 46 supplies the result of detection to the system control unit 50. In addition, the metering unit 46 performs an EF process (a pre-flash process) in cooperation with a light emission control unit 48. The metering unit 46 supplies the result of processing to the system control unit 50.

In addition, the light emission control unit 48 has a function of projecting an AF-assist beam and a function of controlling the amount of flash light. The light emission control unit 48 receives an instruction from the system control unit 50 and emits light at a predetermined point in time in accordance with the instruction.

The system control unit 50 performs overall control of each of the components of the camera body 100. The system control unit 50 includes a determination unit 50a, a determination unit 50b, and a control unit 50c. The determination unit 50a determines whether the mirror drive motor 41a is ready to be switched from the mirror down mode to the mirror up mode. The determination unit 50b determines whether the cam gear 401 has been rotated from the rotational position of the cam gear 401 detected by the position detection unit 40a to a predetermined rotational position. More specifically, the determination unit 50b determines whether the shutter 12 is in a holding mode, the shutter 12 is in a release mode, or the shutter drive motor 40b is ready to be switched to the short-circuit braking mode. The control unit 50c controls the operation performed by the shutter drive motor 40b in accordance with the results of determination made by the determination unit 50a and the determination unit 50b. The operations performed by the determination unit 50a, the determination unit 50b, and the control unit 50c are described in more detail below. The determination unit 50a functions as a "first determination unit". The determination unit 50b functions as a "second determination unit". The control unit 50c functions as a "control unit". A memory 52 stores, for example, constants, variables, and programs used for the operation performed by the system control unit 50.

A presentation unit 54 includes a liquid crystal display apparatus and a speaker that present characters, images, and sound in accordance with execution of the program in the system control unit 50. The presentation unit 54 is disposed in the vicinity of the camera body 100 at a single location or a plurality of locations so that a user can easily view the presentation unit 54. For example, the presentation unit 54 is formed as a combination of a liquid crystal display (LCD), a light emitting diode (LED), and a sound generating device. In addition, some of the functions of the presentation unit 54 are installed in an optical finder 104. For example, among information items displayed by the presentation unit 54, the following information is displayed in the LCD: single shot/continuous shooting information, the number of shots that can be taken, the shutter speed, the aperture value, exposure compensation information, flash exposure compensation information, and a battery level.

In addition, for example, among the information items displayed by the presentation unit 54, the following information is displayed in the optical finder 104: in-focus information, flash-ready information, the shutter speed, the aperture value, and the exposure compensation information. Furthermore, for example, among the information items displayed by the presentation unit 54, the following information is displayed in the LED: recording medium writing operation information. Still furthermore, for example, among the information items displayed by the presentation unit 54, the following information is displayed using a lamp: a self-timer indicator lamp.

A nonvolatile memory 56 is an electrically erasable and recordable memory. Examples of the nonvolatile memory 56 include an electrically erasable programmable read-only memory (EEPROM).

An input unit 80 receives a variety of operation instructions for the system control unit 50 from the user. The input unit 80 is formed from a combination of a switch and a dial or a combination of plurality of switches and dials. The input unit 80 includes a mode dial 60, a shutter switch 62, and a manipulating unit 70.

The mode dial 60 receives an instruction for selecting one of a plurality of shooting modes (e.g., a normal shooting mode and a continuous shooting mode). When the mode dial 60 receives an instruction indicating a continuous shooting mode, the mode dial 60 supplies the instruction to the system control unit 50.

The shutter switch 62 receives different instructions in accordance with whether the operation is in a first stage or a second stage. If the operation is in a first stage (e.g., half pressing), the shutter switch 62 receives a first instruction. Upon receiving a first instruction, the shutter switch 62 turns on a first switch SW1. That is, upon receiving the first instruction, the shutter switch 62 supplies instructions indicating starts of the AF process, the AE process, and an EF process to the system control unit 50.

In contrast, if the operation is in a second stage (e.g., full pressing), the shutter switch 62 receives a second instruction. Upon receiving a second instruction, the shutter switch 62 turns on a second switch SW2. That is, upon receiving the second instruction, the shutter switch 62 supplies instructions indicating start of an operation including a series of an exposure process, a development process, and a recording process to the system control unit 50. Note that in the exposure process, a signal read from the image sensor 13 is written to the memory 30 in the form of image data via the A/D converter 16 and the memory control unit 22. In the development process, computation is performed in the image processing unit 20 and the memory control unit 22. In the recording process, the image data is read from the memory 30. The compression/decompression unit 32 compresses the image data. The recording unit 200 writes the image data to the recording unit 200.

The manipulating unit 70 includes a variety of buttons. For example, the manipulating unit 70 includes a menu button, a set button, a single shot/continuous shooting/self-timer shot switching button, an image quality selection button, an ISO speed ratings selection button, an exposure compensation button, and a flash exposure compensation button. For example, the manipulating unit 70 further includes a playback switch, a white balance setting switch for selecting one of white balance modes, and dials for a variety of settings.

An interface 120 is an interface used to connect the camera body 100 to the lens unit 300 in the lens mount 106. A connector 122 is used to electrically connect the camera body 100 to the lens unit 300. The connector 122 allows the camera body 100 to exchange, for example, a control signal, a status signal, and a data signal with the lens unit 300. In addition, the connector 122 has a function of supplying electrical currents of a variety of voltages.

A mirror 132 further reflects a light ray that is incident on the lens 310 and that is reflected by the mirror 130 and leads the light ray to the optical finder 104. An optical path OP2 of the light ray branches from the imaging optical path OP1 toward the image sensor 13 at a position of a reflecting surface of the mirror 130. The mirror 132 switches between a mirror down mode in which the mirror 132 is in the imaging optical path and a mirror-up mode in which the mirror 132 flips out of the imaging optical path. Note that the mirror 132 may be configured as a quick-return mirror or a half mirror.

Examples of the recording unit 200 include a memory card and a hard disk. The recording unit 200 includes a recording medium 202, an interface 204, and a connector 206. Examples of the recording medium 202 include a semiconductor memory and a magnetic disk. The interface 204 is an interface with the camera body 100. The connector 206 is used to connect the recording unit 200 to the camera body 100.

Figure 2A:
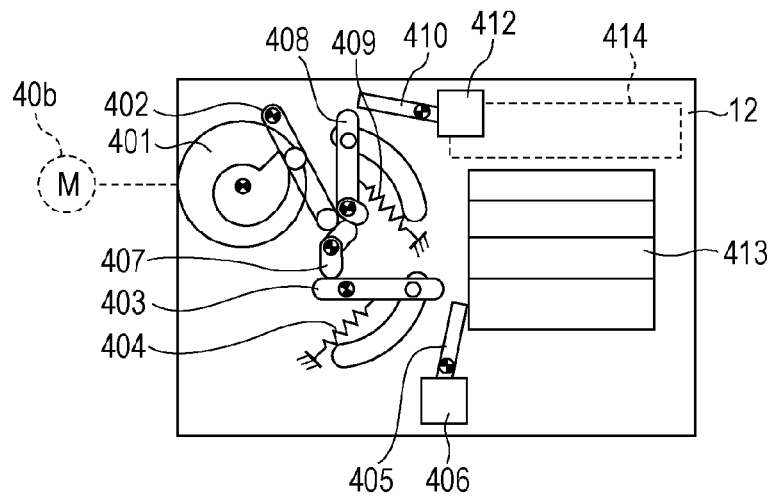
FIGS. 2A to 2C are schematic illustrations of an exemplary structure of a shutter.
Figure 2B:
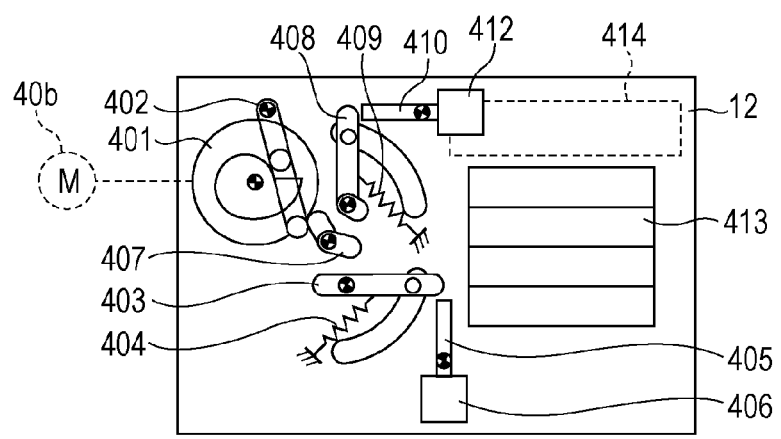
Figure 2C:
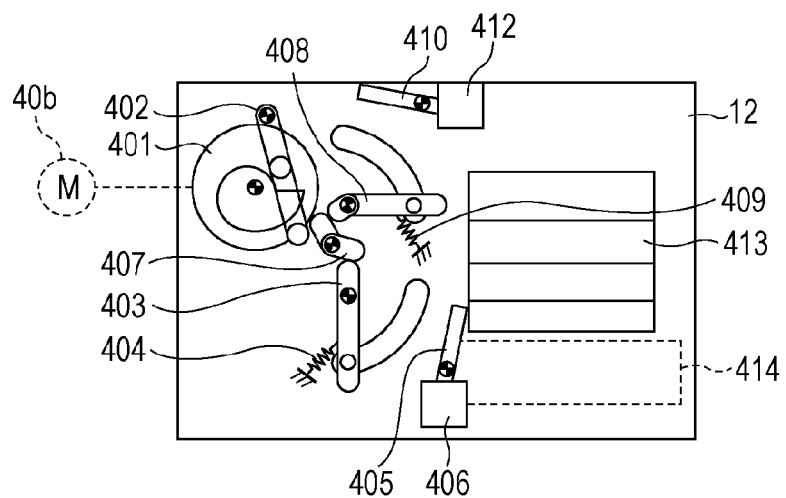

FIGS. 2A to 2C are schematic illustrations of an exemplary structure of the shutter 12.

As illustrated in FIGS. 2A to 2C, a leading shutter blade group 413 closes a shutter opening before exposure starts. The leading shutter blade drive lever 403 is connected to the leading shutter blade group 413. A leading shutter blade drive spring 404 pushes the leading shutter blade drive lever 403. When the biasing force of the leading shutter blade drive spring 404 drives the leading shutter blade drive lever 403, the leading shutter blade group 413 runs so that a mode in which the shutter opening is closed to a mode in which the shutter opening is open.

A trailing shutter blade group 414 opens the shutter opening before exposure starts. A trailing shutter blade drive lever 408 is connected to the trailing shutter blade group 414. A trailing shutter drive spring 409 pushes the trailing shutter blade drive lever 408. When the biasing force of the trailing shutter drive spring 409 drives the trailing shutter blade drive lever 408, the trailing shutter blade group 414 runs so that a mode in which the shutter opening is open to a mode in which the shutter opening is closed. Each of the leading shutter blade drive lever 403 and the trailing shutter blade drive lever 408 functions as a shutter drive member.

The cam gear 401 is rotatably driven by the shutter drive motor 40b in a clockwise direction. A charge lever 402 is urged by a spring (not illustrated) in a clockwise direction. The charge lever 402 has a cam follower formed therein. The cam follower traces the profile of a cam formed in the cam gear 401. The rotational position of the cam gear 401 is detected by the position detection unit 40a.

A cam lever 407 has a first cam portion, a second cam portion, and a contact portion formed therein. The first cam portion is in contact with the leading shutter blade drive lever 403. The second cam portion is in contact with the trailing shutter blade drive lever 408. The contact portion is in contact with the charge lever 402.

When the leading shutter blade drive lever 403 and the trailing shutter blade drive lever 408 are located at their travel end positions and if the cam lever 407 is rotated in a clockwise direction, the leading shutter blade drive lever 403 and the trailing shutter blade drive lever 408 are moved to their travel start positions. In this manner, the leading shutter blade drive spring 404 and the trailing shutter drive spring 409 are charged. The cam lever 407 is urged by a spring (not illustrated) so as to be in contact with the charge lever 402.

When the leading shutter blade drive lever 403 is located at its travel start position and if a leading shutter blade tensioning drive member 406 is powered on, a leading shutter blade tensioning lever 405 holds the leading shutter blade drive lever 403 at its travel start position. By powering off the leading shutter blade tensioning drive member 406, the leading shutter blade tensioning lever 405 releases the leading shutter blade drive lever 403 that is held.

When the trailing shutter blade drive lever 408 is located at its travel start position and if a trailing shutter blade tensioning drive member 412 is powered on, a trailing shutter blade tensioning lever 410 holds the trailing shutter blade drive lever 408 at its travel start position. By powering off the trailing shutter blade tensioning drive member 412, the trailing shutter blade tensioning lever 410 releases the trailing shutter blade drive lever 408 that is held.

In the above-described configuration, the cam gear 401, the charge lever 402, and the cam lever 407 function as a shutter charge unit. In addition, the leading shutter blade tensioning lever 405, the leading shutter blade tensioning drive member 406, the trailing shutter blade tensioning lever 410, and the trailing shutter blade tensioning drive member 412 function as a tensioning unit.

FIG. 2A illustrates the shutter 12 in the holding mode.

In such a mode, the leading shutter blade drive lever 403 and the trailing shutter blade drive lever 408 can be held at their travel start positions without powering on the leading shutter blade tensioning drive member 406 and the trailing shutter blade tensioning drive member 412. In this mode, the first cam portion of the cam lever 407 is in contact with the leading shutter blade drive lever 403, and the second cam portion of the cam lever 407 is in contact with the trailing shutter blade drive lever 408. In addition, the cam follower of the charge lever 402 is in contact with a cam top of a cam portion formed in the cam gear 401, and the charge lever 402 is in contact with the cam lever 407. Accordingly, in the holding mode of the shutter 12, the leading shutter blade drive lever 403 and the trailing shutter blade drive lever 408 are held by the cam gear 401, the charge lever 402, and the cam lever 407. At that time, power is not applied to the leading shutter blade tensioning drive member 406 and the trailing shutter blade tensioning drive member 412.

FIG. 2B illustrates the shutter 12 in the release mode.

In such a mode, the leading shutter blade drive lever 403 and the trailing shutter blade drive lever 408 held by the cam gear 401, the charge lever 402, and the cam lever 407 are released.

The leading shutter blade tensioning drive member 406 and the trailing shutter blade tensioning drive member 412 are held as illustrated in FIG. 2A. Thereafter, the leading shutter blade tensioning drive member 406 and the trailing shutter blade tensioning drive member 412 are powered on and, subsequently, the shutter drive motor 40b is powered on. Thus, the cam gear 401 is rotated in a clockwise direction, as illustrated in FIG. 2B. By rotating the cam gear 401 in a clockwise direction, the cam follower of the charge lever 402 drops into a cam bottom of the cam portion formed in the cam gear 401 and, therefore, the charge lever 402 rotates in a clockwise direction. Since the cam lever 407 is urged in a direction in which the cam lever 407 is brought into contact with the charge lever 402, the cam lever 407 rotates in a counterclockwise direction. Thus, contact of the first cam portion of the cam lever 407 with the leading shutter blade drive lever 403 is broken. In addition, contact of the second cam portion of the cam lever 407 with the trailing shutter blade drive lever 408 is broken. At that time, by powering on the leading shutter blade tensioning drive member 406, the leading shutter blade tensioning lever 405 holds the leading shutter blade drive lever 403 at its travel start position. By powering on the trailing shutter blade tensioning drive member 412, the trailing shutter blade tensioning lever 410 holds the trailing shutter blade drive lever 408 at its travel start position.

FIG. 2C illustrates the shutter 12 in a travel end mode.

In such a mode, the leading shutter blade drive lever 403 is moved to the travel end position by the biasing force of the leading shutter blade drive spring 404. In addition, the trailing shutter blade drive lever 408 is moved to its travel end position by the biasing force of the trailing shutter drive spring 409.

By powering off the leading shutter blade tensioning drive member 406 in the release mode illustrated in FIG. 2B at a predetermined point in time, the leading shutter blade tensioning lever 405 releases the leading shutter blade drive lever 403 that is held. The leading shutter blade drive lever 403 is moved to its travel end position by the biasing force of the leading shutter blade drive spring 404. Thus, the leading shutter blade group 413 travels so that the shutter opening that is closed is opened. Thereafter, by powering off the trailing shutter blade tensioning drive member 412 at a predetermined point in time, the trailing shutter blade tensioning lever 410 releases the trailing shutter blade drive lever 408 that is held. The trailing shutter blade drive lever 408 is moved to the travel end position by the biasing force of the trailing shutter drive spring 409. Thus, the trailing shutter blade group 414 travels so that the shutter opening that is open is closed.

By powering on the shutter drive motor 40b and rotating the cam gear 401 in the travel end mode illustrated in FIG. 2C in a clockwise direction, the charge lever 402 rotates in a counterclockwise direction. Thus, the cam lever 407 rotates in a clockwise direction. Accordingly, the first cam portion of the cam lever 407 is brought into contact with the leading shutter blade drive lever 403, and the second cam portion of the cam lever 407 is brought into contact with the trailing shutter blade drive lever 408. By moving the leading shutter blade drive lever 403 to its travel start position of the leading shutter blade drive lever 403, the leading shutter blade drive spring 404 is charged. In addition, by moving the trailing shutter blade drive lever 408 to the travel start position of the trailing shutter blade drive lever 408, the trailing shutter drive spring 409 is charged. If the cam gear 401 is rotated to the position of the holding mode illustrated in FIG. 2A, the shutter 12 enters the holding mode again.

In this manner, the shutter 12 is switched between the holding mode, the release mode, and the travel end mode. The shutter drive motor 40b drives the shutter 12 so that the shutter 12 moves from the travel end mode to the holding mode and from the holding mode to the release mode.

An exemplary operation performed by the image pickup apparatus 1 is described next with reference to flowcharts illustrated in FIG. 3 and FIGS. 4A and 4B.

Figure 3:
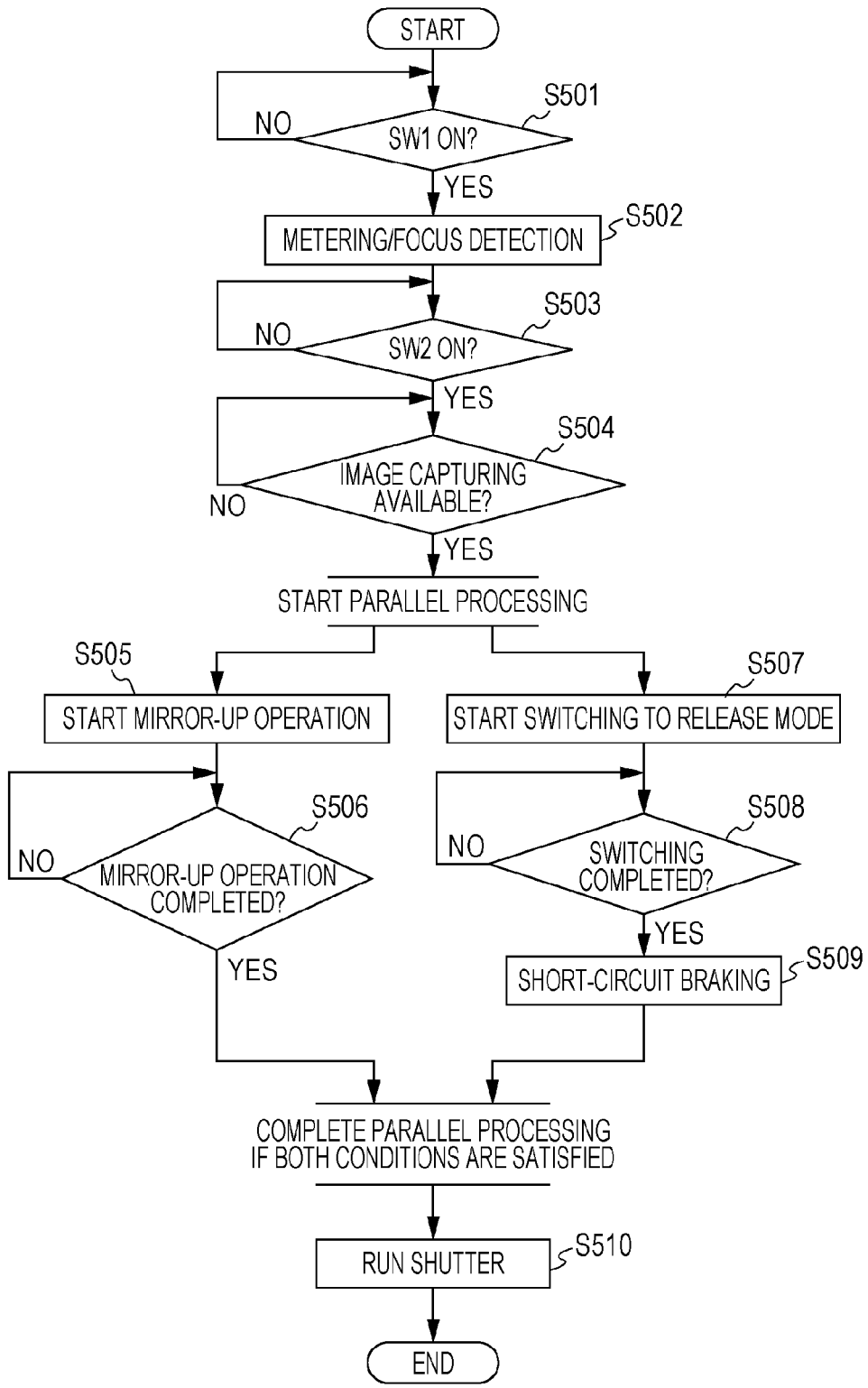
FIG. 3 is a flowchart of an exemplary operation performed by the image pickup apparatus according to a first exemplary embodiment from when the image pickup apparatus receives an image capturing request to when exposure is completed.

FIG. 3 is a flowchart of the operation performed by the image pickup apparatus 1 according to the first exemplary embodiment from when the image pickup apparatus 1 receives an image capturing request to when exposure is completed.

In step S501, if the first switch SW1 is not turned on (NO in step S501), the system control unit 50 repeats the process in step S501. However, if the system control unit 50 detects that the first switch SW1 is turned on (YES in step S501), the processing proceeds to step S502.

In step S502, the system control unit 50 causes the focus detection unit 42 to perform a focus detection process and causes the metering unit 46 to perform a photometric process. Thereafter, the system control unit 50 receives the results of the processes. Upon receiving the result of the focus detection process and the result of the photometric process, the processing performed by the system control unit 50 proceeds to step S503.

If, in step S503, the second switch SW2 is not turned on (NO in step S503), the system control unit 50 repeats the process in step S503. If the system control unit 50 detects that the second switch SW2 is turned on (YES in step S503), the processing performed by the system control unit 50 proceeds to step S504.

In step S504, the system control unit 50 determines whether the lens 310 is in focus on the basis of the result of the focus detection process. In addition, the system control unit 50 determines whether each of the memory 30 and the recording unit 200 has sufficient free space. Thereafter, the system control unit 50 determines whether image capturing is available on the basis of the above-described determination. If the system control unit 50 determines that image capturing is not available (NO in step S504), the system control unit 50 repeats the process in step S504. However, if the system control unit 50 determines that image capturing is available (YES in step S504), the system control unit 50 starts operations performed in steps S505 and S507 at the same time.

In step S505, the system control unit 50 starts supplying power to the mirror drive motor 41a. Note that the power is supplied to the mirror drive motor 41a so that the mirror drive motor 41a performs a mirror-up operation in which the mirror 130 flips out of the imaging optical path.

In step S506, the system control unit 50 determines whether the mirror 130 has reached the mirror up mode, that is, whether the mirror up operation is completed. If the system control unit 50 determines that the mirror up operation has not been completed (NO in step S506), the system control unit 50 repeats the process in step S506. However, if the system control unit 50 determines that the mirror up operation has been completed (YES in step S506), the system control unit 50 powers off the mirror drive motor 41a. Thereafter, the processing enters a wait mode before the processing proceeds to step S510.

In step S507, the system control unit 50 powers on the leading shutter blade tensioning drive member 406 and the trailing shutter blade tensioning drive member 412. Thereafter, the control unit 50c of the system control unit 50 inputs a Low signal to the OUT1 terminal of the shutter drive motor 40b and inputs a Hi signal to the OUT2 terminal of the shutter drive motor 40b so that the shutter drive motor 40b enters the normal drive mode. In this manner, the cam gear 401 rotates from the position in the holding mode illustrated in FIG. 2A in a clockwise direction and starts moving to the release mode illustrated in FIG. 2B.

In step S508, the determination unit 50b of the system control unit 50 determines whether the cam gear 401 has rotated and reached the position in the release mode illustrated in FIG. 2B. That is, the determination unit 50b determines whether the shutter 12 has been moved from the holding mode illustrated in FIG. 2A to the release mode illustrated in FIG. 2B. If the determination unit 50b determines that the movement has yet not been completed (NO in step S508), the determination unit 50b repeats the process in step S508. However, if the determination unit 50b determines that the movement has already been completed (YES in step S508), the processing performed by the system control unit 50 proceeds to step S509.

In step S509, the control unit 50c of the system control unit 50 inputs a Low signal to the OUT1 terminal of the shutter drive motor 40b and inputs a Hi signal to the OUT2 terminal of the shutter drive motor 40b. Thus, the control unit 50c causes the shutter drive motor 40b to enter a short-circuit braking mode. Thereafter, the processing enters a wait mode before the processing proceeds to step S510.

If the two conditions above, that is, the conditions for switching from step S506 to the wait mode and switching from step S508 to the wait mode are simultaneously satisfied, the processing performed by the system control unit 50 proceeds to step S510.

In step S510, the system control unit 50 powers off the leading shutter blade tensioning drive member 406 so that the leading shutter blade tensioning lever 405 releases the leading shutter blade drive lever 403 that is held. Thus, the leading shutter blade group 413 travels so that the shutter opening that is closed is opened. Thereafter, by powering off the trailing shutter blade tensioning drive member 412 at a predetermined point in time, the trailing shutter blade tensioning lever 410 releases the trailing shutter blade drive lever 408 that is held. In this manner, the trailing shutter blade group 414 travels so that the shutter opening that is open is closed.

In this operation, control is performed at the above-described predetermined points in time on the basis of the exposure control value in accordance with the result of the photometric process performed in step S502.

Figure 4B:
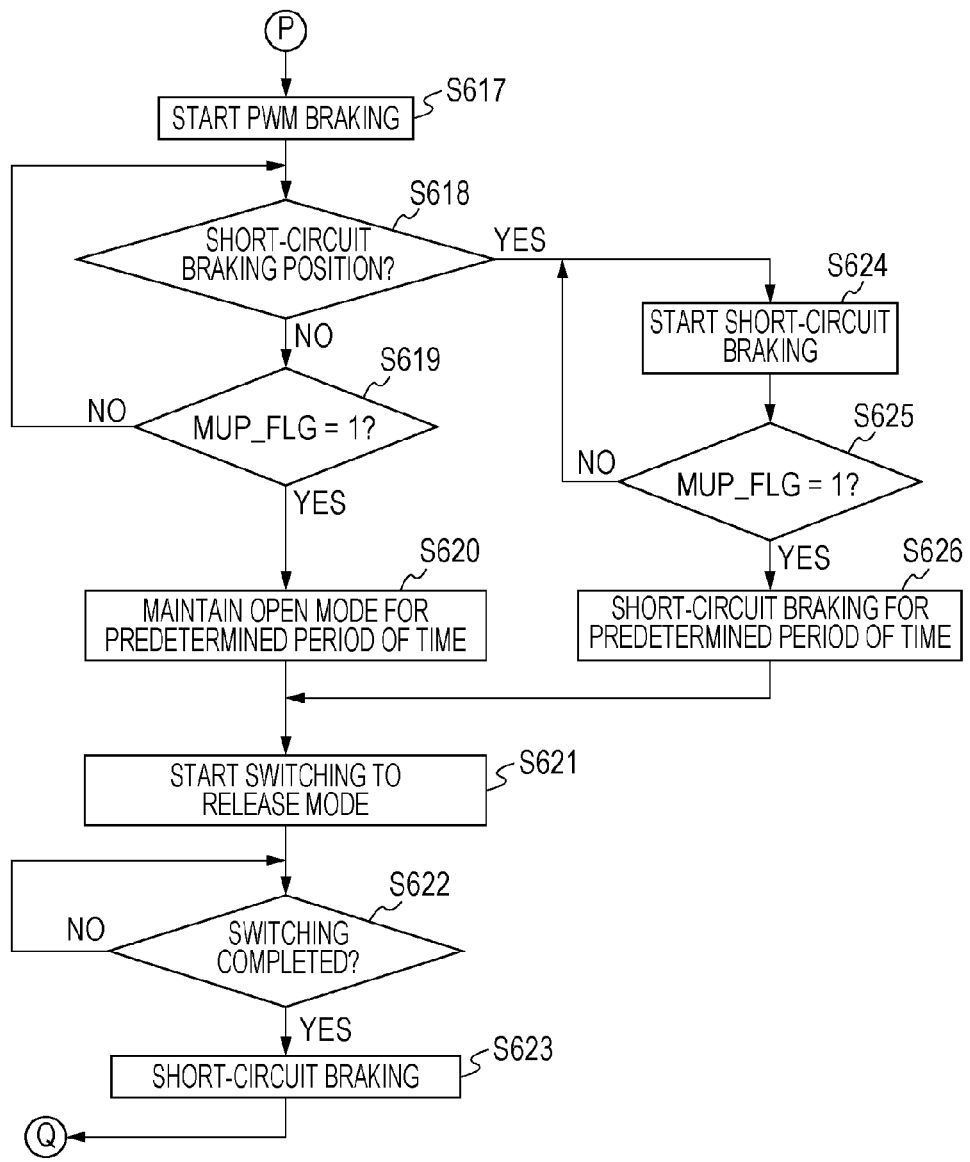

FIGS. 4A and 4B are a flowchart of an exemplary operation performed by the image pickup apparatus 1 after the image pickup apparatus 1 receives an image capturing request and completes an exposure process according to the first exemplary embodiment.

In step S601, the system control unit 50 starts a frame speed stabilizing timer to measure a time for stabilizing the frame speed in continuous shooting. The frame speed stabilizing timer controls a start time of a mirror up operation during continuous shooting in order to make periods of time required for mirror down operations the same, make periods of time required for the photometric operations performed between frames the same, and make periods of time required for the focus detection operations the same. Thereafter, the processing performed by the system control unit 50 proceeds to step S602.

In step S602, the system control unit 50 starts applying power to the mirror drive motor 41a. At that time, the power is applied to the mirror drive motor 41a in order to perform a mirror down operation in which the mirror 130 enters the imaging optical path. Thus, the mirror 130 starts a mirror down operation.

In step S603, the system control unit 50 determines whether the mirror 130 has reached the mirror down end position (a position at which braking is initiated), that is, whether the mirror down operation is completed. If the system control unit 50 determines that the mirror down operation has not been completed (NO in step S603), the system control unit 50 repeats the process in step S603. However, if the system control unit 50 determines that the mirror down operation has been completed (YES in step S603), the system control unit 50 stops supplying power to the mirror drive motor 41a, and the processing performed by the system control unit 50 proceeds to step S604.

In step S604, the system control unit 50 causes the focus detection unit 42 to perform a focus detection process and causes the metering unit 46 to perform a photometric process. Thereafter, the system control unit 50 receives the results of the focus detection process and the photometric process. If the system control unit 50 receives the results of the focus detection process and the photometric process, the processing proceeds to step S605. Since the focus detection process and the photometric process are completed, the determination unit 50a determines that the mirror down mode can be changed to a mirror up mode.

In step S605, the system control unit 50 detects the condition of the second switch SW2. If the second switch SW2 is turned off (NO in step S605), the system control unit 50 determines that an image capturing end instruction has been received. Thus, the system control unit 50 stops the continuous shooting. However, if the second switch SW2 is turned on (YES in step S605), the processing performed by the system control unit 50 proceeds to step S606.

In step S606, the system control unit 50 determines whether each of the memory 30 and the recording unit 200 has sufficient free space. If the system control unit 50 determines that a sufficient free space is not available (NO in step S606), the processing performed by the system control unit 50 proceeds to step S605. However, if the system control unit 50 determines that a sufficient free space is available (YES in step S606), the processing performed by the system control unit 50 proceeds to step S607.

In step S607, the system control unit 50 determines whether measurement made by the frame speed stabilizing timer has been completed, that is, whether a predetermined period of time has elapsed since the mirror 130 started to change from the mirror up mode to the mirror down mode. If the measurement has not been completed (NO in step S607), the processing performed by the system control unit 50 proceeds to step S605. However, if the measurement has been completed (YES in step S607), the processing performed by the system control unit 50 proceeds to step S608.

In step S608, the system control unit 50 sets a mirror-up start flag MUP_FLG to a value indicating that the mirror down mode can be changed to a mirror up mode (e.g., "1").

In step S609, the system control unit 50 starts applying power to the mirror drive motor 41a. At that time, the power is supplied to the mirror drive motor 41a in order to perform a mirror up operation in which the mirror 130 flips out of the imaging optical path. In this manner, the mirror 130 starts the mirror up operation.

In step S610, the system control unit 50 determines whether the mirror 130 reaches the mirror up mode, that is, whether the mirror up operation has been completed. If the system control unit 50 determines that the mirror up operation has yet not been completed (NO in step S610), the system control unit 50 repeats the process in step S610. However, if the system control unit 50 determines that the mirror up operation has already been completed (YES in step S610), the system control unit 50 stops applying power to the mirror drive motor 41a. Thereafter, the processing enters a wait mode before the processing proceeds to step S627.

In step S611, the control unit 50c of the system control unit 50 powers on the shutter drive motor 40b to start charging the shutter 12.

In step S612, the determination unit 50b of the system control unit 50 determines whether the cam gear 401 rotates and reaches the position in the holding mode illustrated in FIG. 2A. That is, the determination unit 50b determines whether the shutter 12 has been moved from the travel end mode illustrated in FIG. 2C to the holding mode illustrated in FIG. 2A. If the determination unit 50b determines that the movement has yet not been completed (NO in step S612), the determination unit 50b repeats the process in step S612. However, if the determination unit 50b determines that the movement has already been completed (YES in step S612), the processing performed by the determination unit 50b proceeds to step S613.

In step S613, the determination unit 50a of the system control unit 50 refers to the mirror-up start flag MUP_FLG and determines whether the mirror down mode can be changed to a mirror up mode using the mirror drive motor 41a.

More specifically, the determination unit 50a determines whether the mirror-up start flag MUP_FLG is set to "1". If the mirror-up start flag MUP_FLG is set to "1", that is, if a mirror up operation is allowed (YES in step S613), the processing proceeds to step S614. However, if the mirror-up start flag MUP_FLG is not set to "1", that is, if a mirror up operation is not allowed (NO in step S613), the processing proceeds to step S617.

In step S614, the system control unit 50 applies powers to the leading shutter blade tensioning drive member 406 and the trailing shutter blade tensioning drive member 412.

If, in step S613, the mirror-up start flag MUP_FLG is set to "1", the normal drive mode remains unchanged without stopping the shutter drive motor 40b, and the holding mode illustrated in FIG. 2A is changed to the release mode illustrated in FIG. 2B.

In step S615, the determination unit 50b of the system control unit 50 determines whether the cam gear 401 reaches the position in the release mode illustrated in FIG. 2B. That is, the determination unit 50b determines whether the holding mode of the shutter 12 illustrated in FIG. 2A has been switched to the release mode illustrated in FIG. 2B. If the determination unit 50b determines that the switching has yet not been completed (NO in step S615), the determination unit 50b repeats the process in step S615. However, if the determination unit 50b determines that the switching has already been completed (YES in step S615), the processing performed by the system control unit 50 proceeds to step S616.

In step S616, the control unit 50c of the system control unit 50 inputs a Low signal to the OUT1 terminal of the shutter drive motor 40b and inputs a Hi signal to the OUT2 terminal of the shutter drive motor 40b. Thus, the control unit 50c causes the shutter drive motor 40b to enter a short-circuit braking mode. Thereafter, the processing enters a wait mode before the processing proceeds to step S627.

If the two conditions above, that is, the conditions for switching from step S610 to the wait mode and exit from step S616 to the wait mode are simultaneously satisfied, the processing performed by the system control unit 50 proceeds to step S627.

If, in step S613, the mirror-up start flag MUP_FLG is not set to "1", the processing proceeds to step S617. In step S617, the control unit 50c of the system control unit 50 inputs a Low signal to the OUT1 terminal of the shutter drive motor 40b and inputs a PWM signal to the OUT2 terminal. Thus, the shutter drive motor 40b enters a PWM braking mode.

In step S618, the determination unit 50b of the system control unit 50 determines whether the cam gear 401 is located at a short-circuit braking position. That is, the determination unit 50b determines whether the shutter 12 enters a mode close to the release mode illustrated in FIG. 2B. More specifically, the determination unit 50b detects the rotational angle of the cam gear 401 and determines whether the cam gear 401 is located at the short-circuit braking position.

If the determination unit 50b determines that the cam gear 401 is not located at the short-circuit braking position (NO in step S618), the processing proceeds to step S619. However, if the cam gear 401 is located at the short-circuit braking position (YES in step S618), the processing performed by the determination unit 50b proceeds to step S624.

In step S619, the determination unit 50a of the system control unit 50 refers to the mirror-up start flag MUP_FLG and determines whether the mirror down mode can be changed to a mirror up mode using the mirror drive motor 41a.

More specifically, the determination unit 50a determines whether the mirror-up start flag MUP_FLG is set to "1". If the mirror-up start flag MUP_FLG is set to "1", that is, if a mirror up operation is allowed (YES in step S619), the processing proceeds to step S620. However, if the mirror-up start flag MUP_FLG is not set to "1", that is, if a mirror up operation is not allowed (NO in step S619), the processing proceeds to step S618.

In step S620, the control unit 50c of the system control unit 50 inputs a Low signal to the OUT1 terminal of the shutter drive motor 40b and inputs a Hi signal to the OUT2 terminal of the shutter drive motor 40b for a predetermined period of time. Thus, the shutter drive motor 40b is in the open mode only for the predetermined period of time. If the shutter drive motor 40b is in the open mode, the rotation shaft of the shutter drive motor 40b rotates for the predetermined period of time due to the force of inertia. Thereafter, the processing enters a wait mode before the processing proceeds to step S621.

In step S621, the system control unit 50 applies power to the leading shutter blade tensioning drive member 406 and the trailing shutter blade tensioning drive member 412. Thereafter, the control unit 50c of the system control unit 50 inputs a Low signal to the OUT1 terminal of the shutter drive motor 40b and inputs a Hi signal to the OUT2 terminal of the shutter drive motor 40b so that the shutter drive motor 40b enters the normal drive mode. In this manner, the cam gear 401 rotates in a clockwise direction so as to start switching from the holding mode illustrated in FIG. 2A to the release mode illustrated in FIG. 2B.

In step S622, the determination unit 50b of the system control unit 50 determines whether the cam gear 401 rotates and reaches the position in the release mode illustrated in FIG. 2B. That is, the determination unit 50b determines whether the shutter 12 has been moved from the holding mode illustrated in FIG. 2A to the release mode illustrated in FIG. 2B. If the determination unit 50b determines that the movement has yet not been completed (NO in step S622), the determination unit 50b repeats the process in step S622. However, if the determination unit 50b determines that the movement has already been completed (YES in step S622), the processing performed by the determination unit 50b proceeds to step S623.

In step S623, the control unit 50c of the system control unit 50 inputs a Low signal to the OUT1 terminal of the shutter drive motor 40b and inputs a Hi signal to the OUT2 terminal of the shutter drive motor 40b. Thus, the control unit 50c causes the shutter drive motor 40b to enter a short-circuit braking mode. Thereafter, the processing enters a wait mode before the processing proceeds to step S627.

If the two conditions above, that is, the conditions for switching from step S610 to the wait mode and switching from step S623 to the wait mode are simultaneously satisfied, the processing performed by the system control unit 50 proceeds to step S627.

If, in step S618, the cam gear 401 is located at the short-circuit braking position (YES in step S618), the processing performed by the determination unit 50b of the system control unit 50 proceeds to S624. In step S624, the control unit 50c of the system control unit 50 inputs a Low signal to the OUT1 terminal of the shutter drive motor 40b and inputs a Hi signal to the OUT2 terminal of the shutter drive motor 40b. Thus, the shutter drive motor 40b enters the short-circuit braking mode. Thereafter, the processing proceeds to step S625.

In step S625, the determination unit 50a of the system control unit 50 refers to the mirror-up start flag MUP_FLG and determines whether the mirror down mode can be changed to a mirror up mode using the mirror drive motor 41a.

More specifically, the determination unit 50a determines whether the mirror-up start flag MUP_FLG is set to "1". If the mirror-up start flag MUP_FLG is set to "1", that is, if a mirror up operation is allowed (YES in step S625), the processing proceeds to step S626. However, if the mirror-up start flag MUP_FLG is not set to "1", that is, if a mirror up operation is not allowed (NO in step S625), the processing proceeds to step S624.

In step S626, the control unit 50c of the system control unit 50 sets the shutter drive motor 40b in the short-circuit braking mode for a predetermined period of time after the control unit 50c determined that the mirror-up start flag MUP_FLG is set to "1". That is, the control unit 50c inputs a Low signal to the OUT1 terminal of the shutter drive motor 40b and inputs a Hi signal to the OUT2 terminal of the shutter drive motor 40b. At that time, even when the cam gear 401 is completely stopped, the shutter drive motor 40b continues to be in the short-circuit braking mode for the predetermined period of time. Subsequently, the processing proceeds to step S621.

FIG. 5 is a sequence diagram illustrating the modes of the mirror drive motor 41a and the shutter drive motor 40b in the flowchart including steps S611, S612, S613, S617, S618, S619, S620, S621, S622, and S623.

In step S617, PWM braking starts at a point A in time illustrated in FIG. 5. In step S619, the mirror-up start flag MUP_FLG is set to "1" at a point C in time illustrated in FIG. 5. In step S620, the shutter drive motor 40b enters the open mode at the point C in time illustrated in FIG. 5. The predetermined period of time during which the shutter drive motor 40b is in the open mode starts at the point C and ends at a point D in time illustrated in FIG. 5.

In the processing flow indicated by steps S611, S612, S613, S617, S618, S619, S620, S621, S622, and S623, the mirror-up start flag MUP_FLG is set to "1" before the cam gear 401 rotates to the short-circuit braking position. Thus, when the mirror-up start flag MUP_FLG is set to "1", the shutter drive motor 40b enters the open mode without entering the short-circuit braking mode.

As indicated by the sequence diagram illustrated in FIG. 5, by setting the shutter drive motor 40b in the open mode for the predetermined period of time, the point in time at which driving of the mirror drive motor 41a starts does not overlap the point in time at which driving of the shutter drive motor 40b starts. That is, after a predetermined period of time has elapsed since the mirror drive motor 41a was powered on for a mirror up operation, the shutter drive motor 40b is switched to the normal drive mode. In this manner, an increase in an inrush current generated when two motor drive points in time coincide can be prevented. By preventing the increase in an inrush current, a risk of damaging a battery serving as a power supply can be reduced. In addition, by setting the shutter drive motor 40b in the open mode, the shutter drive motor 40b that is rotating due to the force of inertia can be switched to a normal drive mode when the mode is switched to the release mode. Accordingly, the shutter 12 can be switched to the release mode in a shorter time than in the case in which the shutter drive motor 40b that is stopped is started. Furthermore, an amount of electrical current required for switching the shutter 12 to a release mode can be reduced.

Figure 6:
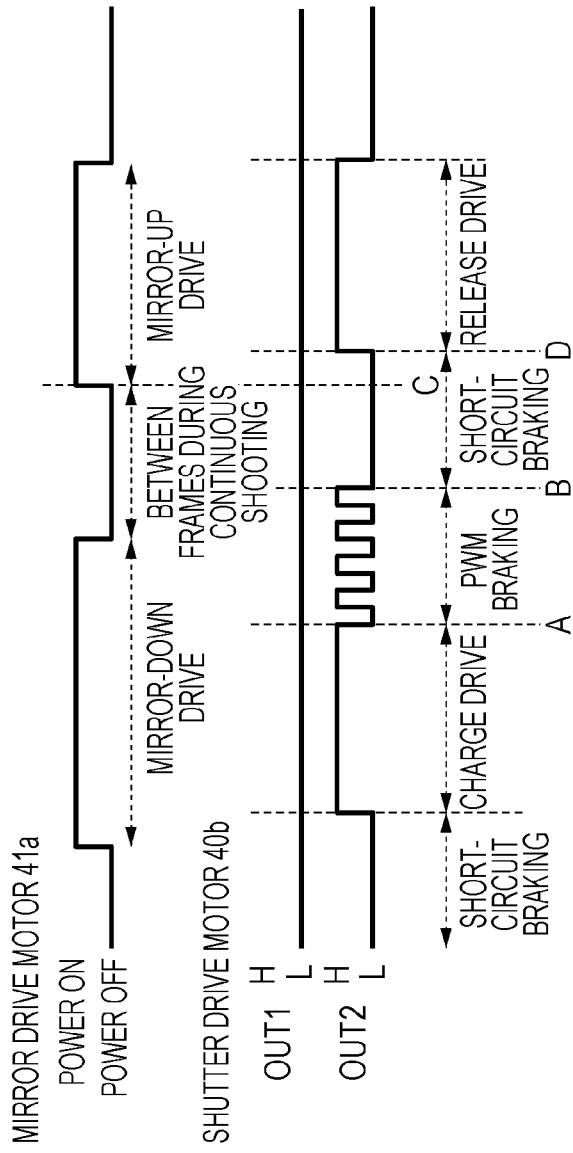
FIG. 6 is a sequence diagram illustrating the modes of a mirror drive motor and a shutter drive motor according to the first exemplary embodiment.

FIG. 6 is a sequence diagram illustrating the modes of the mirror drive motor 41a and the shutter drive motor 40b in the flowchart including steps S611, S612, S613, S617, S618, S624, S625, S621, S626, S621, S622, and S623.

In step S617, PWM braking starts at a point A in time illustrated in FIG. 6. In step S624, short-circuit braking starts at a point B in time illustrated in FIG. 6. In step S625, the mirror-up start flag MUP_FLG is set to "1" at a point C in time illustrated in FIG. 6. The predetermined period of time during which the shutter drive motor 40b is set in the short-circuit braking mode starts at the point C and ends at a point D in time illustrated in FIG. 6.

As indicated by the sequence diagram illustrated in FIG. 6, by setting the shutter drive motor 40b in the open mode for the predetermined period of time, the point in time at which driving of the mirror drive motor 41a starts does not overlap the point in time at which driving of the shutter drive motor 40b starts. That is, after a predetermined period of time has elapsed since the mirror drive motor 41a was powered on for a mirror up operation, the shutter drive motor 40b is switched to the normal drive mode. In this manner, an increase in an inrush current generated when two motor drive points in time coincide can be prevented. By preventing the increase in an inrush current, a risk of damaging a battery serving as a power supply can be reduced.

According to the present exemplary embodiment, when the shutter drive motor 40b is in the PWM braking mode due to a charge operation performed by the shutter drive motor 40b and if a mirror up operation is allowed before the short-circuit braking position is detected, the shutter drive motor 40b is rotated by the force of inertia. That is, if a mirror up operation is allowed, a release operation is highly likely to start immediately. Accordingly, the shutter drive motor 40b is not decelerated any more. In contrast, when the shutter drive motor 40b is in the PWM braking mode due to a charge operation performed by the shutter drive motor 40b and if the short-circuit braking position is detected before a mirror up operation is allowed, the shutter drive motor 40b is stopped. That is, if a mirror up operation is not allowed, a release operation is not likely to start immediately. Accordingly, the shutter drive motor 40b is stopped.

In either case, a point in time at which the shutter drive motor 40b is driven is delayed so that the point in time at which driving of the mirror drive motor 41a starts does not overlap the point in time at which driving of the shutter drive motor 40b starts.

Second Exemplary Embodiment

In the above-described first exemplary embodiment, when the shutter drive motor 40b performs a charge operation in a PWM braking mode and if a mirror up operation is allowed before the short-circuit braking position is detected, the shutter drive motor 40b is allowed to rotate by the force of inertia. In contrast, when the shutter drive motor 40b performs a charge operation in the PWM braking mode and if the short-circuit braking position is detected before a mirror up operation is allowed, the shutter drive motor 40b is stopped.

In the second exemplary embodiment, when the shutter drive motor 40b performs a charge operation and if a mirror up operation is allowed after short-braking is started and before stoppage of the shutter drive motor 40b is detected, the shutter drive motor 40b is allowed to rotate by the force of inertia. In contrast, when the shutter drive motor 40b performs a charge operation and if stoppage of the shutter drive motor 40b is detected after short-circuit braking is started and before a mirror up operation is allowed, the shutter drive motor 40b remains stopped.

According to the second exemplary embodiment, the shutter drive motor 40b outputs, to the system control unit 50, a signal indicating that an output shaft is rotating. Accordingly, the system control unit 50 can determine whether the shutter drive motor 40b is rotating or stationary. This mechanism functions as a second determination unit.

Figure 7B:
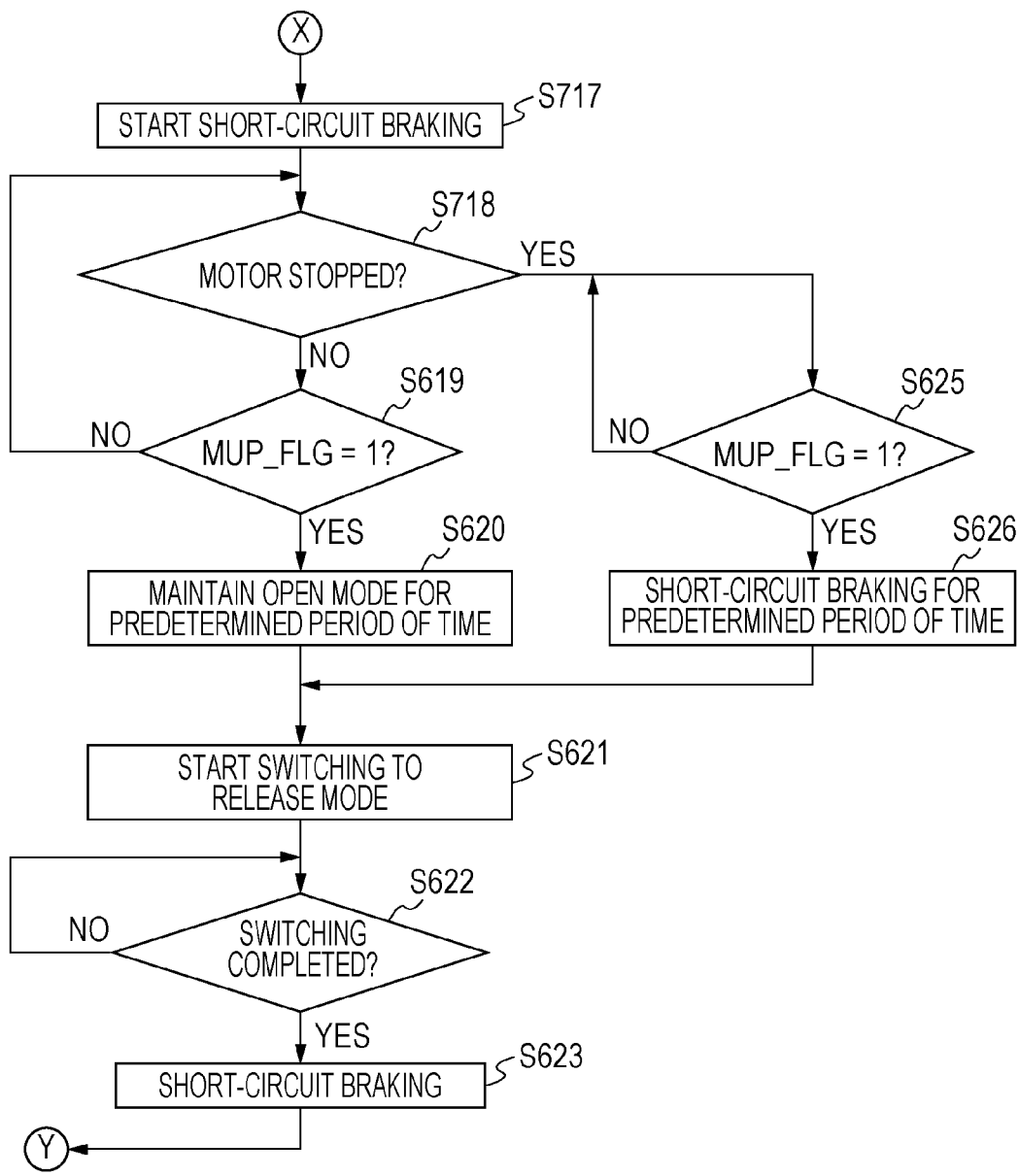

FIGS. 7A and 7B are a flowchart of an exemplary operation performed by the image pickup apparatus 1 after the image pickup apparatus 1 receives an image capturing request and completes an exposure operation according to the second exemplary embodiment. In FIGS. 7A and 7B, the same reference characters are used for identical steps as used for those in FIGS. 4A and 4B and, therefore, descriptions of the steps are not repeated.

In step S612, the system control unit 50 determines whether the cam gear 401 has rotated and reached the position in the holding mode illustrated in FIG. 2A. That is, the system control unit 50 determines whether the shutter 12 has been moved from the travel end mode illustrated in FIG. 2C to the holding mode illustrated in FIG. 2A. If the system control unit 50 determines that the movement has yet not been completed (NO in step S612), the system control unit 50 repeats the process in step S612. However, if the system control unit 50 determines that the movement has already been completed (YES in step S612), the processing performed by the system control unit 50 proceeds to step S713.

In step S713, the determination unit 50a of the system control unit 50 refers to the mirror-up start flag MUP_FLG and determines whether the mirror down mode can be changed to a mirror up mode using the mirror drive motor 41a.

If, in step S713, the mirror-up start flag MUP_FLG is not set to "1", the processing proceeds to step S717. However, if, in step S713, the mirror-up start flag MUP_FLG is set to "1", the processing proceeds to step S615.

In step S717, the system control unit 50 inputs a Low signal to the OUT1 terminal of the shutter drive motor 40b and inputs a Hi signal to the OUT2 terminal of the shutter drive motor 40b. Thus, the system control unit 50 causes the shutter drive motor 40b to enter a short-circuit braking mode.

In step S718, the system control unit 50 determines whether the output shaft of the shutter drive motor 40b is rotating or stationary. If, in step S718, the output shaft of the shutter drive motor 40b is rotating, the processing proceeds to S620. However, if, in step S718, the output shaft of the shutter drive motor 40b is stationary, the processing proceeds to S625.

According to the second exemplary embodiment, if a mirror up operation is allowed after the shutter drive motor 40b starts short-circuit braking and before stoppage of the shutter drive motor 40b is detected, the shutter drive motor 40b is allowed to rotate by the force of inertia. That is, if a mirror up operation is allowed, a release operation is highly likely to start immediately. Accordingly, the shutter drive motor 40b is not decelerated any more.

In contrast, if a mirror up operation is allowed after the shutter drive motor 40b starts a short-circuit braking operation and stoppage of the shutter drive motor 40b is detected, the short-circuit braking mode continues until a predetermined period of time has elapsed since the mirror up operation was allowed.

In either case, a point in time at which the shutter drive motor 40b is driven is delayed so that the point in time at which driving of the mirror drive motor 41a starts does not overlap the point in time at which driving of the shutter drive motor 40b starts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-022148 filed Feb. 3, 2012, which is hereby incorporated by reference herein in its entirety.

What is claimed is:

1. An image pickup apparatus comprising:
a shutter being switchable between a holding mode, in which a shutter spring is charged to hold a shutter drive member, a release mode, in which the shutter drive member that is held is released with the shutter spring being charged, and a travel end mode, in which the shutter drive member has traveled from the release mode using the shutter spring;
a shutter drive motor configured to switch the shutter from the travel end mode to the holding mode and from the holding mode to the release mode;
a mirror configured to switch between a mirror down mode, in which the mirror enters an imaging optical path, and a mirror up mode, in which the mirror flips out of the imaging optical path;
a mirror drive motor configured to drive the mirror from the mirror down mode to the mirror up mode;
a control unit configured to control the shutter drive motor so the shutter drive motor is switched between a drive mode, in which the shutter drive motor is driven, a first braking mode, in which the shutter drive motor is decelerated, a second braking mode, in which the shutter drive motor is decelerated more strongly than in the first braking mode, and an open mode, in which the shutter drive motor is idle;
a first determination unit configured to determine whether the mirror drive motor is ready to drive the mirror from the mirror down mode to the mirror up mode; and
a second determination unit configured to determine whether the shutter drive motor is to be switched from the first braking mode to the second braking mode,
wherein if the first determination unit determines that the mirror drive motor is not ready to start driving the mirror to the mirror up mode after the shutter drive motor drives the shutter to the holding mode, the control unit switches the shutter drive motor to the first braking mode, and
wherein if the first determination unit determines that the mirror drive motor is ready to start driving the mirror to the mirror up mode after the shutter drive motor is switched to the first braking mode and before the second determination unit determines that the shutter drive motor is to be switched to the second braking mode, the control unit switches the shutter drive motor to the open mode until a predetermined period of time has elapsed since the first determination unit determined that the mirror drive motor was ready to start driving the mirror to the mirror up mode.

2. The image pickup apparatus according to claim 1, wherein if the second determination unit determines that the shutter drive motor is to be switched to the second braking mode after the shutter drive motor is switched to the first braking mode and before the first determination unit determines that the mirror drive motor is ready to start driving the mirror to the mirror up mode, the control unit switches the shutter drive motor to the second braking mode and maintains the shutter drive motor in the second braking mode until a predetermined period of time has elapsed since the first determination unit determined that the mirror drive motor was ready to start driving the mirror to the mirror up mode.

3. The image pickup apparatus according to claim 1, wherein if the first determination unit determines that the mirror drive motor is ready to start driving the mirror to the mirror up mode after the shutter drive motor drives the shutter to the holding mode, the control unit continues to maintain the shutter drive motor in the drive mode until the release mode occurs without stopping the shutter drive motor in the holding mode of the shutter.

4. The image pickup apparatus according to claim 1,
wherein when the control unit switches the shutter drive motor to the first braking mode, a pulse signal is input into a terminal connected to a coil of the shutter drive motor, and
wherein when the control unit switches the shutter drive motor to the second braking mode, the terminal of the shutter drive motor is short-circuited.

5. An image pickup apparatus comprising:
a shutter being switchable between a holding mode, in which a shutter spring is charged to hold a shutter drive member, a release mode, in which the shutter drive member that is held is released with the shutter spring being charged, and a travel end mode, in which the shutter drive member has traveled from the release mode using the shutter spring;
a shutter drive motor configured to switch the shutter from the travel end mode to the holding mode and from the holding mode to the release mode;
a mirror configured to switch between a mirror down mode, in which the mirror enters an imaging optical path and a mirror up mode, in which the mirror flips out of the imaging optical path;
a mirror drive motor configured to drive the mirror from the mirror down mode to the mirror up mode;
a control unit configured to control the shutter drive motor so that the shutter drive motor is switched between a drive mode, in which the shutter drive motor is driven, a braking mode, in which the shutter drive motor is decelerated, and an open mode, in which the shutter drive motor is idle;
a first determination unit configured to determine whether the mirror drive motor is ready to drive the mirror from the mirror down mode to the mirror up mode; and
a second determination unit configured to determine whether the shutter drive motor is stopped,
wherein if the first determination unit determines that the mirror drive motor is not ready to start driving the mirror to the mirror up mode after the shutter drive motor drives the shutter to the holding mode, the control unit switches the shutter drive motor to the braking mode, and
wherein if the first determination unit determines that the mirror drive motor is ready to start driving the mirror to the mirror up mode after the shutter drive motor is switched to the braking mode and before the second determination unit determines that the shutter drive motor is stopped, the control unit switches the shutter drive motor to the open mode until a predetermined period of time has elapsed since the first determination unit determined that the mirror drive motor was ready to start driving the mirror to the mirror up mode.

6. The image pickup apparatus according to claim 5, wherein if the second determination unit determines that the shutter drive motor is stopped after the shutter drive motor is switched to the braking mode and before the first determination unit determines that the mirror drive motor is ready to start driving the mirror to the mirror up mode, the control unit continues to maintain the shutter drive motor in the braking mode until a predetermined period of time has elapsed since the first determination unit determined that the mirror drive motor was ready to start driving the mirror to the mirror up mode.

7. The image pickup apparatus according to claim 5, wherein if the first determination unit determines that the mirror drive motor is ready to start driving the mirror to the mirror up mode after the shutter drive motor drives the shutter to the holding mode, the control unit continues to maintain the shutter drive motor in the drive mode until the release mode occurs without stopping the shutter drive motor in the holding mode of the shutter.

* * * * *